Aug. 16, 1955 F. A. KROHM 2,715,728
WINDSHIELD WIPER ARM ASSEMBLY
Filed April 17, 1951

INVENTOR.
FRED A. KROHM
BY
Charles S. Penfold
ATTORNEY

United States Patent Office 2,715,728
Patented Aug. 16, 1955

2,715,728

WINDSHIELD WIPER ARM ASSEMBLY

Fred A. Krohm, Gary, Ind., assignor to Productive Inventions, Inc., a corporation of Indiana Application April 17, 1951, Serial No. 221,387

9 Claims. (Cl. 15—255)

This invention relates generally to windshield wiper arms and particularly to improvements for detachably connecting an arm to a drive shaft.

The invention is adapted for use with a wiper arm assembly comprising an inner shaft receiving section, an outer arm unit pivotally connected to the inner section, and a spring for urging the arm and a wiper blade carried thereby toward a windshield.

The primary object of the invention is to provide the inner shaft receiving section of the arm assembly with a device comprising a locking element for engaging the shaft, means for manually operating the element, and a connection between the spring and device so that when the manual operating means is manipulated to disengage the element from the shaft, the spring will automatically cause the device to move outwardly away from the shaft and thereby assist in disconnecting the arm assembly from the shaft. The arrangement is preferably such that the spring offers sufficient tension to prevent accidental movement of the manually operating means after it has been adjusted to cause the element to lock the arm assembly to a shaft.

An important object of the invention is to provide an arm assembly in which the locking element is mounted on the pivot which connects the shaft receiving section with the outer arm unit.

A significant object of the invention is to provide an arm construction in which the outer arm unit includes an intermediate channel section pivotally secured to the inner shaft receiving section, an extensible bar section slidably mounted in the channel section, and a novel friction locking assembly for locking the bar section in any longitudinal position desired.

A particular object of the invention is to provide an arm construction of the character just referred to in which the outer bar section and the friction locking assembly may be readily connected with the intermediate channel section without the aid of tools.

Another object of the invention is to provide an arm assembly in which the spring serves the quadruple function of urging the outer arm unit toward a windshield, the locking device on the inner shaft receiving section outwardly holding components of the friction locking assembly detachably connected with the outer arm unit, and assisting to hold the cover assembled with the arm. More particularly, the arrangement is preferably such that by merely moving one component of the locking assembly in one position, the extensible bar section can be adjusted to any one of an infinite number of longitudinal positions and then locked in place by moving said component to another position.

A further object of the invention is to provide a cover or shroud for the spring and a novel means for connecting it to the arm assembly.

Other objects and advantages of the invention will appear after the description hereinafter set forth is considered in conjunction with the drawings annexed hereto.

In the drawings where like parts are identified by the same numerals:

Figure 7:
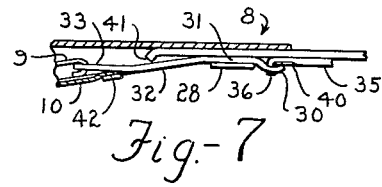
Figures 5, 8:
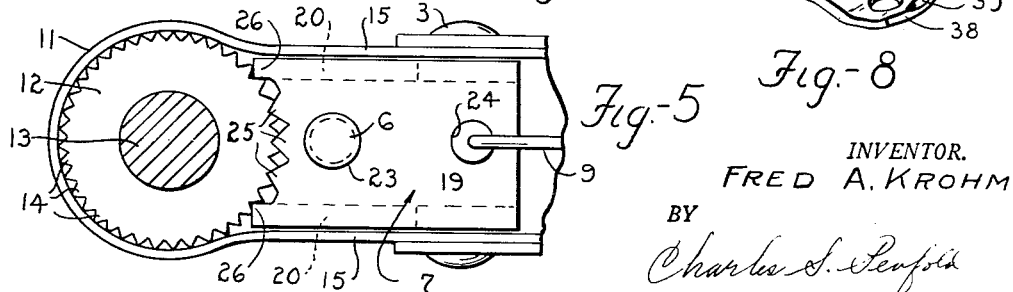
Figure 5 is an enlarged bottom view of a portion of the arm assembly showing an interlocking between a locking element on the arm assembly and a key or drum carried by a shaft.

Figure 7 is a longitudinal sectional view of a portion of the intermediate channel section of the arm assembly showing the novel locking means whereby the outer bar section of the assembly can be secured in any one of an infinite number of positions to which it may be adjusted; and Figure 8 is an enlarged perspective view of a portion of one of the components of the locking means on the outer arm unit.

The arm assembly above referred to generally includes, among other things, an inner shaft receiving section 1, an intermediate channel section 2 pivotally connected to the inner section 1 by means of a cross pin or pivot 3; an extensible bar section 4 slidably mounted in the channel section; a connector 5 carried by the free end of the bar section for supporting a wiper blade; a locking device comprising a manually operable means 6 and a locking element 7; a friction locking assembly 8 for locking the extensible section in any longitudinal position desired; an elongated helical spring 9 having its opposite ends respectively connected to the locking device and friction locking assembly for urging the channel and bar sections as a unit toward a windshield; and a cover 10 for the spring.

The shaft receiving section 1 of the wiper arm assembly and locking device associated therewith will be described first. The section 1 is preferably constructed from sheet metal and made in the form of a cap or housing to provide a tapered cylindrical socket 11 which receives a tapered cylindrical fitting or drum 12, the latter being secured for movement with a drive shaft 13. The drum may be a separate part secured to the shaft or constitute an integral part or enlargement thereof. The periphery of the drum is provided with a plurality of relatively fine longitudinal serrations or teeth 14, the majority of which intimately engage the tapered inner cylindrical wall of the socket when the cap section is pressed onto the drum.

The cap section includes a radial channel offset having parallel side walls 15 which merge with the wall defining the socket 11 and an outer wall 16 which is common to the socket and the radial channel. That portion of the outer wall 16 which constitutes the base wall of the socket may engage the shaft as shown or the outer end of the drum to limit inward movement of the cap section when it is applied to the drum. That portion of the outer wall constituting the base wall of the radial channel is formed with a depression having an opening 17 therein. The manual operating means 6 preferably made in the form of a screw has its head 18 seated in the depression.

The locking element 7 is preferably elongated and one extremity thereof is threadedly connected to and supported by the screw and its other extremity is pivotally mounted on the cross pivot 3, the latter constituting a fulcrum for the element when the screw is tightened. This element may be designed and constructed as desired, but as herein shown includes a base portion 19 and a pair of corresponding parallel wall portions 20 provided with upturned ears 21 having holes 22 therein which receive the pivot 3. The base portion 19 is provided with a threaded aperture 23 intermediate its ends through which the shank of the screw extends. Portion 19 is also provided with a hole 24 which detachably receives one hooked end of the spring 9. Attention is directed to the fact that the pivot 3 is located relatively close to the frontal portions of sections 1 and 2 of the arm assembly. Otherwise expressed, the pivot 3 is preferably located substantially in alignment with the outer wall 16 of the cap section 1 so as to provide ample space therebelow for movement of locking element 7 and for the purpose of locating the connection between the locking element and spring 9 in a predetermined position spaced from the pivot 3 so that the spring, among other things, will pull the outer arm unit toward a windshield. It should also be noted that the widths of the locking element and the radial channel portion of the cap section are such that the locking element is in some measure guided by the walls 15 of the radial channel. These structural arrangements plus the fact that the side walls of the locking element are supported adjacent the extremities of the cross pivot affords a well stabilized assembly for restricting movement of the locking element to a predetermined plane.

The inner marginal edge of portion 19 of the locking element is provided with a plurality of projections or teeth 25. The teeth 25 are inset with respect to the inner marginal ends of the side walls 20 of the locking element and the inner opposed parallel arises of the walls are formed to provide teeth 26 of considerable length. The teeth 25 and 26 are preferably arcuately disposed so as to substantially conform to the curvature of the serrated drum 12. The spacing of these teeth is preferably somewhat greater than the circumferential spacing of the teeth or serrations 14 on the drum so that regardless of the rotative position of the arm on the drum, the teeth on the locking element will more or less automatically fit in between the teeth on the drum as clearly illustrated in Figure 5 of the drawing. With this setup the locking element will embrace a portion of the drum and the elongated teeth 26 on the side walls of the locking element will engage the drum for a considerable longitudinal distance to promote stability and insure a good grip on the drum when the screw is tightened. This arrangement prevents canting of the locking device with respect to the drum and maintains the locking element in correct alignment with the drum. Due to the fact that the drum is made of a softer material than the locking element, the teeth on the latter will actually bite into and distort a portion of the drum to afford a positive lock between the arm assembly and shaft 13. Attention is further directed to the fact that when the screw is tightened the locking element will in effect be wedged in between the pivot 3 and the drum and that such wedging action tends to draw the cap section tightly onto the drum. When the screw 6 is loosened the spring 9 will function to automatically pull the locking element outwardly so as to disengage it from the drum and thereby assist in disconnecting the arm from the drum. The connection between the screw, locking element and the cap section is preferably such that the screw 6 may pivot when manipulated.

A locking element may be supported in another way as disclosed and claimed in my copending application Serial No. 216,779, filed March 21, 1951, and additional means for adjusting the tension of the spring is disclosed and claimed in a copending application of John W. Anderson Serial No. 235,001 filed July 3, 1951.

The friction locking assembly whereby different effective lengths of the arm assembly may be obtained will now be described. More particularly, the friction locking assembly includes an elongated holding member 27 which is interposed between the bar arm section 4 and a pair of inturned integral lugs 28 formed on the walls adjacent the outer end of the channel arm section 2. The side walls of the channel section 2 are also provided with a pair of inturned abutments 29 similar to and spaced inwardly from the lugs 28. It will be noted that the channel arm section 2 of the arm is of a substantially uniform cross-section between its outer end and the abutments 29 and that an intermediate portion of the channel section is tapered or of a variable cross-section.

The holding member 27 may be formed to assume any shape desired but as herein illustrated preferably includes an outer offset end portion 30, a flat portion 31, an inclined portion 32 and an inturned inner end portion 33. The inner end portion 33 is provided with a hole, not shown, which detachably receives the outer hooked end of the spring 9 to normally pull the member 27 toward the cap section 1 of the arm. All of the portions of the holding member, except the outer offset end portion 30, are preferably arranged substantially within the confines of the channel arm section 2 and all of the portions, except the flat portion 31 which bears against the bar section 4, are spaced from the bar section. The offset end portion 30 is provided with an aperture 34. A manually operable lever 35 is interposed between the bar section 4 and the lever is provided with a transverse projection 36 disposed in the aperture 34 for pivotally connecting the lever to the holding member 27 for movement in an arc of 180 degrees. Attention is directed to the fact that the offset end 30 of the holding member is made yieldable and is provided with a cam portion 37 and a concave lip 38 having a detent 39 therein. The sides of the lever 35 are provided with corresponding bevels or chamfers 40 so that the lever will readily ride over the sharp edges on the offset end 30.

Figure 3:
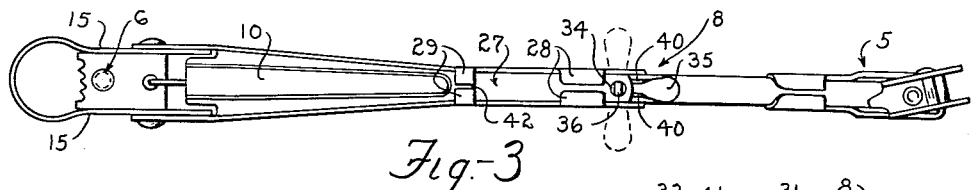
Figure 3 is a bottom view of the arm assembly.

The components of the assembly are so constructed that when the lever is in either of the dotted line positions shown in Figure 3, the bar section 4 may be adjusted to any longitudinal position desired. When the lever is manipulated to the full line position so that the lever is caught in the detent 39 the offset end 30 of the holding member will be placed under sufficient tension to cause the lever to be forced against the bar section and the latter against the outer base wall of the channel arm section 2 to lock the bar section in the position to which it has been adjusted. More particularly, the lever when in a locking position tends to wedge the bar section and holding member apart and as a result the base wall of the channel 2 and the lugs 28 constitute abutments which in some measure limit the extent of the wedging action. Due to the fact that the holding member 27 is provided with a cam portion 37 the spring 9 will cause the cam portion to bear against the lugs 28 and force the holding member against the bar section 4 and the latter against the base of the channel section 2 so that when the bar section is extended to a desired position it normally temporarily stays in such position until the bar section is positively locked in place by the lever. In other words, sufficient friction is established to resist, with practical limits, longitudinal movement of the bar section. Outward movement of the bar section 4 is limited by a stop 41 thereon for engaging the inclined portion 32 of the holding member.

Figure 1:
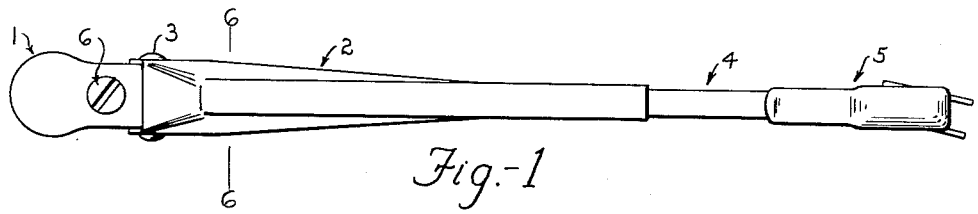
Figure 1 is a top view of the arm assembly embodying the invention.
Figure 2:
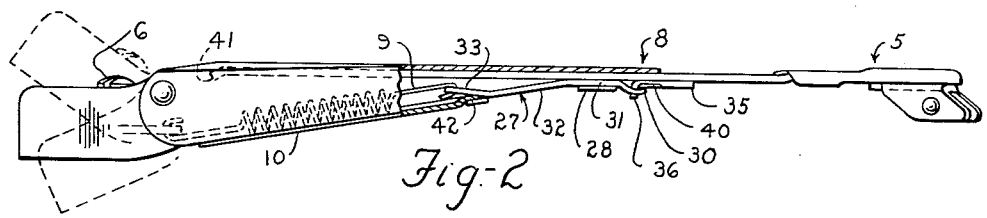
Figure 2 is a side view in elevation of the arm assembly shown in Figure 1 with portions in section to illustrate details of construction.

The channel section 2, bar section 4, holding member 27 and lever 35 are assembled in a unique manner. The bar section is preferably first inserted into the channel section 2 between its base wall and the lugs 28. The holding member 27 is then inserted into the channel section for a distance between the bar section and the lugs, after which the lever 35 is interposed between the holding member and bar section with the projection 36 on the lever disposed in the aperture 34 of the holding member, whereupon the holding member and lever as a unit are pressed into their respective positions as illustrated in Figure 2. More particularly, it will be apparent that the various portions of the holding member provide a formation which, among other things, more or less receives the lugs or abutment means 28 so as to assist in maintaining the holding member assembled with the channel section 2. If found desirable, this procedure may be varied by assembling the lever and holding member in advance of inserting the holding member into the channel section. The lever is usually held at right angles to the holding member during assembly and may be used as a handle for urging or pressing the holding member into the channel section 2. After the parts are thus more or less loosely assembled, the lever 35 may be swung to the full line position in alignment with the bar section 4 to positively lock the parts in place and particularly the arm section 4 with respect to the channel section 2. The arrangement is preferably such that the parts will not ordinarily accidentally become separated or detached when the lever is in an unlocked position and the spring 9 is not connected to the holding member 27. This feature is important because in some instances the procedure employed in manufacturing the arm may require that the spring 9 be connected to the holding member 27 following certain other assembly operations. However, insurance against accidental disassembly can, of course, be readily accomplished by merely moving the lever to a locking position before the spring 9 is attached to the holding member.

Figure 6:
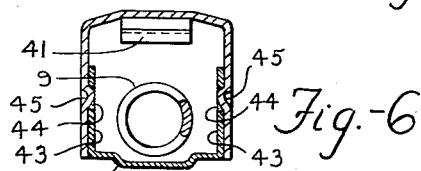
Figure 6 is a transverse sectional view taken substantially on line 6—6 of Figure 1 showing the way one extremity of the cover is secured to the arm.
Figure 4:
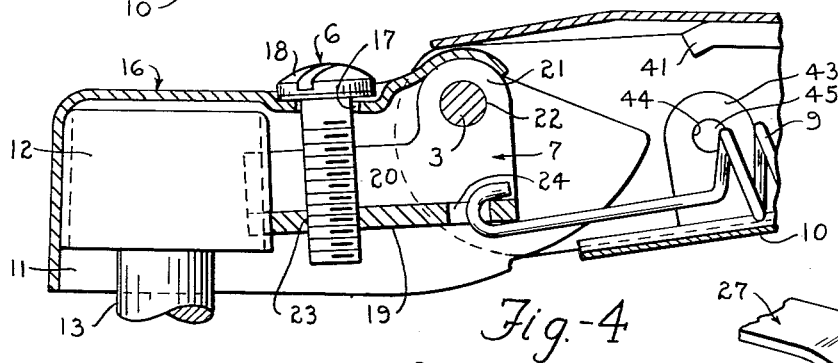
Figure 4 is an enlarged longitudinal sectional view taken through a portion of the arm assembly to exemplify its operative relationship with a drive shaft.

As indicated above, one of the objects of the invention is to provide a cover or shroud 10 for concealing from view the spring 9. The cover may be constructed and connected to the arm in different ways, but as herein illustrated it is preferably detachably connected so that its outer reduced offset extremity 42 is caught and pressed between the inturned abutments 29 on the channel section 2 and the inclined portion 33 of the holding member 27 by means of the spring as clearly shown in Figure 2 of the drawing. The opposite extremity of the cover is preferably provided with a pair of inturned resilient fingers 43 having apertures 44 therein which receive inturned projections 45 formed on the side walls of the channel 2 as clearly shown in Figures 4 and 6. The cover is preferably tapered or of a shape to conform and fit in the channel arm section 2.

In view of the foregoing, it will be apparent that a number of novel features are embodied in the wiper arm assembly and that the spring 9 is utilized to form a plurality of functions including holding one extremity of the cover 10 in place.

While I have shown and described my invention in connection with a certain specified embodiment, it will, of course, be understood that I do not wish to be limited thereto, since it is apparent that modifications may be made in such embodiment and the materials thereof without departing from the spirit nad scope of my invention as set forth in the appended claims.

I claim:

1. A windshield wiper arm assembly adapted to be attached to a drive shaft provided with an enlargement comprising a housing adapted to receive the enlargement, an outer arm unit pivotally connected to the housing, manually operable means mounted on said housing for adjustment, a locking element for engaging the enlargement arranged in and connected to the housing and connected to said manually operable means, and a spring having one end connected to the outer unit and its other end to the locking element for pulling the locking element toward the outer unit when the locking element is released from a locking position by the manually operable means.

2. A windshield wiper arm assembly adapted to be attached to a drive shaft comprising a housing adapted to receive an end of the shaft, a fulcrum on said housing, a locking element for engaging the shaft end arranged in the housing and pivotally connected to said fulcrum, a screw operatively connected to the locking element and mounted on said housing for adjustment exteriorly thereof, said assembly including an outer arm unit pivotally connected to the housing, and a spring having one end connected to the outer arm unit and its other end to the locking element.

3. A subassembly for attaching a windshield wiper arm to a drive shaft comprising an elongated housing having a socket for receiving an end of the shaft and a radial channel communicating with the socket, said channel having a base wall, manually operable means extending through the base wall into the channel, a locking element connected to the channel for movement therein and having a part connected to the manually operable means and a part for engaging the shaft end, and a spring for normally pulling the locking element outwardly.

4. A windshield wiper arm adapted for attachment to a drive shaft comprising a housing adapted to receive an end of the shaft, a channel section having its inner extremity pivotally connected to the housing, projections and abutments respectively provided on the inner and outer extremities of the channel section, a bar section having its inner end arranged for longitudinal adjustment in the outer extremity of the channel section and its outer end having means for connection with a wiper blade, a locking device mounted on the housing comprising a screw arranged for adjustment exteriorly thereof and a locking element connected to the screw for engaging the shaft end, a holding member carried by the channel section, a spring having one end connected to the holding member and its other end to the locking device, an elongated cover having one end caught between the holding member and abutments and its other end having openings receiving the projections on the channel section for securing the cover in place so that the spring and its connection with the holding member are substantially concealed from view.

5. A locking element for use with the inner section of a windshield wiper arm for securing the inner section to a shaft, said locking element comprising a channel member having a base wall and side walls, openings provided in the side walls for pivotally supporting the element, a threaded aperture in the base wall for receiving the shank of a screw adapted for support on the inner section and also provided with means to which a spring can be connected, teeth provided in a marginal end edge of the base wall, and marginal end edges of the side walls forming elongated teeth, said teeth being complementary to one another for engaging a shaft.

6. A windshield wiper arm assembly comprising a shaft engaging inner section, an intermediate section pivotally connected to the inner section, an outer section for supporting a cleaner slidably mounted on the intermediate section, a locking device connected to the inner section for attaching the arm assembly to a shaft, abutment means on the intermediate section, a holding member interposed between the outer section and the abutment means, a locking element interposed between the outer section and the holding member for locking the outer section in any extended or retracted position desired, and a spring connected to the locking device and to the holding member.

7. A subassembly of a windshield wiper arm comprising a first arm section having abutment means, an extensible arm section slidably mounted on the first arm section, a holding member slidably mounted between the first arm section and the abutment means, and having a cam portion, and a spring having one end connected to the holding member and its opposite end being adapted for connection with another arm part in a manner to pull the cam portion against the abutment means to cause the holding member to press the extensible arm section against the first arm section to frictionally hold the extensible arm section in any desired position with respect to the first arm section.

8. A windshield wiper arm assembly comprising a shaft engaging inner section, an intermediate section pivotally connected to the inner section, an outer section carried by the intermediate section for supporting a cleaner, abutment means on the intermediate section, a movable holding member carried by the intermediate section, a spring connected to the holding member and to the inner section, and a cover for the spring having a part arranged between the holding member and abutment means, said spring serving to urge the intermediate section and outer section as a unit relative to the inner section and also cause the holding member to press the said cover part against the abutment means whereby to assist in holding the cover in place.

9. A windshield wiper arm adapted for attachment to a drive shaft comprising a housing adapted to receive an end of the shaft, a channel section having its inner extremity pivotally connected to the housing, spaced cooperating means respectively provided on the inner and outer extremities of the channel section, a bar section having its inner end arranged for longitudinal adjustment in the outer extremity of the channel section and its outer end having means for connection with a wiper blade, a locking device mounted on the housing comprising a screw arranged for adjustment exteriorly thereof and a locking element connected to the screw for engaging the shaft end, a holding member carried by the channel section, a spring having one end connected to the holding member and its other end to the locking device, an elongated cover having one end caught between the holding member and one of the cooperating means and its other end having means engaging the other of the cooperating means on the channel section for securing the cover in place so that the spring and its connection with the holding member are substantially concealed from view.

References Cited in the file of this patent

UNITED STATES PATENTS

| Number | Name | Date |
|---|---|---|
| 1,952,866 | Hueber | Mar. 27, 1934 |
| 2,153,522 | Oishei | Apr. 4, 1939 |
| 2,156,505 | Marcolivio | May 2, 1939 |
| 2,229,720 | Bramming | Jan. 28, 1941 |
| 2,326,402 | Smulski | Aug. 10, 1943 |
| 2,365,251 | Curtiss | Dec. 19, 1944 |
| 2,376,714 | Mussen | May 22, 1945 |
| 2,499,809 | Zaiger | Mar. 7, 1950 |
| 2,557,755 | Nesson | June 19, 1951 |